United States Patent [19]

Ueno et al.

[11] 4,324,877
[45] Apr. 13, 1982

[54] METHOD FOR POLYMERIZING α-OLEFIN

[75] Inventors: Haruo Ueno, Chiba; Takefumi Yano, Ichihara; Tokuji Inoue, Ichihara; Shigeru Ikai, Ichihara; Masanori Tamura, Ichihara; Sakae Yuasa, Ichihara, all of Japan

[73] Assignee: Ube Industries, Ltd., Yamaguchi, Japan

[21] Appl. No.: 208,302

[22] Filed: Nov. 19, 1980

[30] Foreign Application Priority Data

Nov. 29, 1979 [JP] Japan .................. 54/153626

[51] Int. Cl.³ .................. C08F 4/02; C08F 10/06
[52] U.S. Cl. .................. 526/127; 252/429 B; 526/128; 526/351
[58] Field of Search .................. 526/127, 128

[56] References Cited

U.S. PATENT DOCUMENTS

| | | | |
|---|---|---|---|
| 3,787,323 | 1/1974 | Aishima et al. | 526/127 |
| 3,843,620 | 10/1974 | Piekarski et al. | 526/128 |
| 4,235,984 | 11/1980 | Shiga et al. | 526/127 |
| 4,258,167 | 3/1981 | Tsubaki et al. | 526/127 |

Primary Examiner—Edward J. Smith
Attorney, Agent, or Firm—Burgess, Ryan and Wayne

[57] ABSTRACT

An α-olefin polymer having an excellent H.I. is produced with a high yield by bringing, in the presence of an organic acid ester, a feed containing at least one α-olefin, having 3 or more carbon atoms, into contact with a catalyst composed of:
a solid catalytic ingredient which has been prepared in such a manner that an aluminosiloxy compound of the formula,

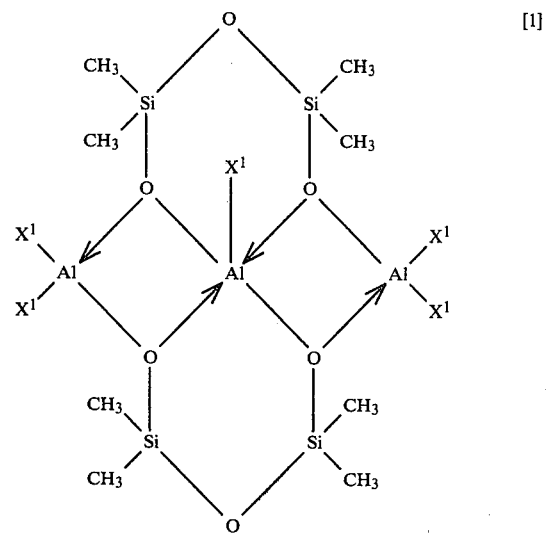

[1]

wherein $X^1$ represents a chlorine atom, a bromine atom or an iodine atom, is reacted with a Grignard compound of the formula $R^1MgX^2$[II] wherein $R^1$ represents an alkyl radical having 1 to 8 carbon atoms and $X^2$ represents a halogen atom, the resultant solid reaction product is brought into contact with a titanium tetrahalide, the resultant titanium-containing solid product is treated with an organic acid ester, and the treated solid product is brought into contact with a titanium tetrahalide; and
a trialkyl aluminum.

23 Claims, No Drawings

METHOD FOR POLYMERIZING α-OLEFIN

FIELD OF THE INVENTION

The invention relates to a method for polymerizing an α-olefin. More particularly, the present invention relates to a method for polymerizing an α-olefin having three or more carbon atoms.

BACKGROUND OF THE INVENTION

There have been proposed various methods for polymerizing an α-olefin having 3 or more carbon atoms by using a catalyst composed of a solid catalytic ingredient in which a titanium tetrahalide is carried on a magnesium compound, and an organic aluminum compound, to increase the yield of the resultant polymer per unit weight of the solid catalytic ingredient to such an extent that an operation for removing the used catalyst from the resultant polymer can be omitted.

For example, Japanese Patent Application Laid-open No. 54-107987 discloses a method for polymerizing an α-olefin using a catalyst composed of a solid catalytic component which has been prepared by reacting aluminum chloride with a reaction product by hydropolysiloxane and a Grignard compound, and by bringing the resultant solid product into contact with a titanium tetrahalide in the presence of an organic acid ester, and of a trialkyl aluminum. By this method, the resultant polymer yield per unit weight of the catalyst can be remarkably increased as compared with a method in which a titanium trichloride-organic aluminum catalyst is employed for polymerization of an α-olefin, but according to the example of the above-cited Laid-open specification, the polymer yield per g of the solid catalytic component per hour of polymerization time remains as low as 3,000 g or less. To permit omission of an operation for removing the residual catalyst from the resultant polymer, it is desired that the polymer yield be further increased.

SUMMARY OF THE INVENTION

It is an object of the present invention to provide a method for polymerizing an α-olefin having 3 or more carbon atoms which is capable of assuring a markedly high polymer yield per unit weight of a solid catalytic component.

It is another object of the present invention to provide a method for polymerizing an α-olefin having 3 or more carbon atoms which is capable of omitting an operation for removing a residual catalyst from the resultant polymer.

It is still another object of the present invention to provide a method for polymerizing an α-olefin having 3 or more carbon atoms which is capable of producing an α-olefin polymer having an excellent stereoregularity in a high yield.

The above-mentioned objects can be attained by the method of the present invention which comprises bringing, in the presence of an organic acid ester, a feed containing at least one α-olefin, having 3 or more carbon atoms, into contact with a catalyst composed of:

a solid catalytic ingredient which has been prepared in such a manner that an aluminosiloxy compound of the formula,

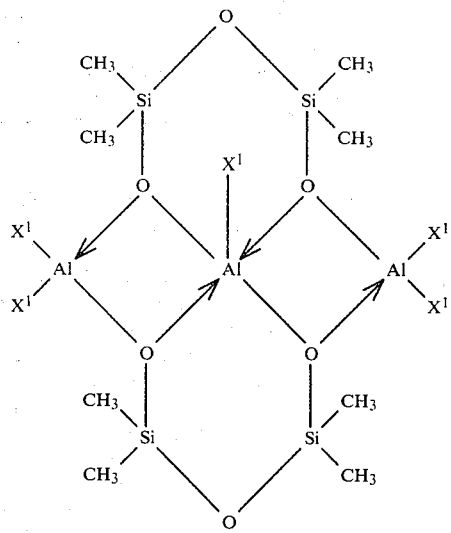

wherein $X^1$ represents a chlorine atom, a bromine atom or an iodine atom, is reacted with a Grignard compound of the formula $R^1MgX^2$[II] wherein $R^1$ represents an alkyl radical having 1 to 8 carbon atoms and $X^2$ represents a halogen atom, the resultant solid reaction product is brought into contact with a titanium tetrahalide, the resultant titanium-containing solid product is treated with an organic acid ester, and the treated solid product is brought into contact with a titanium tetrahalide; and a trialkyl aluminum.

According to the present invention, there can be provided desired effects such that the yield of the resultant polymer per unit weight of a solid catalytic ingredient employed is so high that an operation for removing a residual catalyst in the resultant polymer can be omitted, and that the resultant polymer can have an excellent stereoregularity.

In the present invention, a solid catalytic ingredient is prepared in an atmosphere consisting of an inert gas, e.g. a nitrogen gas or an argon gas, from a compound which contains substantially no water therein.

The aluminosiloxy compound of the formula [I] employed in the present invention may be synthesized by reacting an aluminum halide of the formula $AlX_3^1$ wherein $X^1$ represents a chlorine atom, a bromine atom or an iodine atom, with dimethyl polysiloxane [Angewandte Chemie, International Edition, 4, 201 (1966)].

In the present invention, a Grignard compound of the formula [II] is employed, and, in particular, a compound of the formula [II] wherein $X^2$ is a chlorine atom is preferably employed. As specific examples of this compound, there can be mentioned butylmagnesium chloride, hexylmagnesium chloride, propylmagnesium chloride, etc.

It is preferable that the Grignard compound be used in an amount of from 0.1 to 10 moles, more preferably, 0.5 to 5 moles, per mole of the aluminosiloxy compound of the formula [I].

There is no special requirement for the method for reacting the Grignard compound with the aluminosiloxy compound of the formula [I], but there may be preferably employed a method in which a solution of the Grignard compound, in an ether or in a mixture of the ether and an aromatic hydrocarbon, is gradually added to a solution of the aluminosiloxy compound of the formula [I] in an inert organic solvent to effect the reaction, or a method in which the latter solution is gradually added to the former solution. The above-mentioned ether may be preferably selected from compounds of the formula $R^2—O—R^3$ wherein $R^2$ and $R^3$ represent alkyl radicals having 2 to 8 carbon atoms, respectively. As specific examples of the compounds, there can be mentioned di-n-butyl ether, di-isobutyl ether, di-n-amyl ether, di-isoamyl ether, etc. The reaction temperature is usually in a range of from $-50°$ to $50°$ C. The reaction time is not critical, but usually five minutes or more. The reaction proceeds accompanying heat generation and results in precipitation of a solid white reaction product. After completion of the reaction, the resultant precipitated solid product is separated by means of filtration or decantation and the separated product is washed with an organic inert solvent and, then, brought into contact with a titanium tetrahalide.

The titanium tetrahalide to be used in the present invention is preferably selected from titanium tetrachloride, titanium tetrabromide and titanium tetraiodide. It is preferable that the titanium tetrahalide is used in an amount of one mole or more, more preferably, from 2 to 100 moles, per mole of the Grignard compound used in the preparation of the solid product. The contact of the solid reaction product with the titanium tetrahalide is carried out in the presence or absence of an inert organic solvent, for example, benzene, toluene, hexane and heptane. It is preferable that the contact temperature be $20°$ to $200°$ C., more preferably $60°$ to $140°$ C. The contact time is not critical, but is usually 0.5 to 3 hours. The resultant titanium-containing solid product is separated by means of filtration or decantation, and the separated product is washed with an inert organic solvent and subjected to treatment with an organic acid ester. The titanium-containing solid product may contain 0.5 to 10% by weight of titanium.

The organic acid ester to be used in the present invention can be selected from aliphatic carboxylic acid esters, aromatic carboxylic acid esters and cycloaliphatic carboxylic acid esters. However, it is preferable that the organic acid ester be selected from the aromatic carboxylic acid esters of the formula:

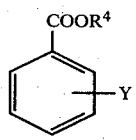

wherein $R^4$ represents an alkyl radical having 1 to 6 carbon atoms and Y represents a hydrogen atom, an alkyl radical having 1 to 4 carbon atoms or a radical of the formula $—OR^5$ in which $R^5$ represents an alkyl radical having 1 to 4 carbon atoms. As specific examples of the preferable organic acid esters, there can be mentioned methyl benzoate, ethyl benzoate, methyl toluate, ethyl toluate, methyl anisate and ethyl anisate. The organic acid ester is preferably used in an amount of from 0.1 to 10 millimoles per gram of the titanium-containing solid product. There are no special requirements for the method for treating the titanium-containing solid product with the organic acid ester. However, there may preferably be employed a method in which the titanium-containing solid product is suspended in an inert organic solvent, and the organic acid ester is added to the suspension while stirring the mixture. The treating temperature is preferably from $0°$ to $200°$ C., more preferably from $5°$ to $150°$ C. The treating time is not critical, but usually 5 minutes or more. The resultant treated solid product is separated from the mixture containing the treated solid product by means of filtration or decantation, washed with an inert organic solvent, and, then, brought into contact with a titanium tetrahalide again.

This contact operation of the treated solid product with the titanium tetrahalide may be carried out in the same manner as that of the contact operation of the solid reaction product with the titanium tetrahalide. The resultant solid catalytic ingredient is separated from the mixture containing the solid catalytic ingredient by means of filtration or decantation and washed with an inert organic solvent. The solid catalytic ingredient may contain 0.5 to 5% by weight of titanium.

In the present invention, the resultant solid catalytic ingredient is used together with trialkyl aluminum as a catalyst, in the presence of an organic acid ester, to polymerize an α-olefin. The trialkyl aluminum to be used in the present invention may be selected from compounds of the formula $AlR_3^6$ wherein $R^6$ represents an alkyl radical having 2 to 6 carbon atoms. As specific examples of the compounds, there can be mentioned triethylaluminum, tri-isobutylaluminum and tri-n-hexylaluminum. Especially, triethylaluminum and tri-isobutylaluminum are preferably used. The amount of the trialkyl aluminum to be used is usually in a range of from 1 to 1,000 moles per gram atom of titanium contained in the solid catalytic ingredient.

The organic acid ester to be presented in the polymerization system is suitably selected from those usuable for the treatment of the titanium-containing solid product. The ratio of the organic acid ester to be presented in the polymerization system is preferably from 0.05 to 0.6 moles per mole of trialkyl aluminum used for the preparation of the catalyst.

Examples of the α-olefin to be fed for the polymerization in accordance with the present invention include propylene, 1-butene, 4-methyl-1-pentene and 1-hexene. In the present invention, one kind of α-olefin may be fed for effecting polymerization, or a mixture of different α-olefins or a mixture of an α-olefin and ethylene may be fed to effect copolymerization.

The polymerization reaction may be carried out in a liquid or a gas phase.

In case the polymerization reaction is carried out in the liquid phase, an inert organic solvent may be used as a polymerization medium or a liquid α-olefin per se may be used as the polymerization medium. There are no special requirements for the concentration of the catalyst in the polymerization medium. The concentration of the solid catalytic ingredient is usually in a range of from 0.001 to 10 milligram atoms, in terms of titanium, per liter of the polymerization medium, and the concentration of the trialkyl aluminum is in a range of 0.01 to 1,000 millimoles per liter of the polymerization medium.

In the present invention, the polymerization operation can be carried out under conditions insulated from water and oxygen in the same manner as that for the polymerization operation of the α-olefin using a Ziegler-natta type catalyst. The polymerization temperature is usually in a range of from $30°$ to $100°$ C. and the polymerization pressure is usually in a range of from 1 to 80 kg/cm².

The molecular weight of the α-olefin polymer obtained according to the method of the present invention can be easily regulated by adding hydrogen to the polymerization system.

Examples will now be described. In the following description, the term "polymerization activity" used refers to a yield in grams of a resultant polymer per gram of a solid catalytic ingredient used in the polymerization reaction, per hour of polymerization time, and the term "H.I." used refers to a ratio in percent of the weight of a residue remaining after a polymer is extracted with boiling n-heptane for twenty hours, to the entire weight of the polymer.

In each of the examples, the preparation of a solid catalytic ingredient was carried out in a dry nitrogen atmosphere.

EXAMPLE 1

(1) Synthesis of Aluminosiloxy Compound of Formula [I] wherein $X^1$ is Chlorine Atom (hereinafter referred to as aluminosiloxy chloride)

12.0 g of aluminum chloride was added to 20.9 g of dimethyl polysiloxane (TORAY SILICON SH-200, Viscosity at a temperature of 20° C.: 100 centipoises) and the materials were heated up while being stirred. The reaction system became of a homogeneous phase at a temperature of 90° C. When heated up to a temperature of 110° C., the system was allowed to react, at the same temperature, with stirring for four hours. After completion of the reaction, the resultant reaction mixture was allowed to cool to room temperature, and the resultant precipitated colorless crystals were separated by filtration and washed with n-heptane. A recrystallization operation was repeated two times to obtain 25.0 g of pure crystals.

The result of elemental analysis and the melting point of the obtained pure crystals are as follows:

|  | Elemental Analysis | | |
|---|---|---|---|
|  | C, % | H, % | Cl, % |
| Found | 16.40 | 4.18 | 29.47 |
| Claculated for $Al_3C_8H_{24}O_6Cl_5Si_4$ | 16.40 | 4.09 | 30.20 |

Melting Point 153° C.
(Values in literatures: 152° to 154° C.)

From these results, the crystals were identified as alumiosiloxy chloride.

(2) Preparation of Solid Catalytic Ingredient 4 millimoles of aluminosiloxy chloride was dissolved in 50 ml of toluene and the resultant solution was cooled to a temperature of −20° C. A solution of 20 millimoles of n-butylmagnesium chloride in 17 ml of di-isoamyl ether was added dropwise to the former solution over one hour while stirring the mixture. The temperature of the reaction system was maintained in a range of from −20° to −15° C. After completion of the dropwise addition, the reaction was allowed to proceed at a temperature of −20° C. for one hour. Then, the resultant reaction mixture was allowed to warm to room temperature. The resultant precipitated white solid product was separated by filtration and washed with toluene.

The resultant solid product was suspended in 50 ml of toluene, and 200 millimoles of titanium tetrachloride were added to the suspension. The mixture was stirred at a temperature of 110° C. for one hour so as to allow the solid product to come into contact with titanium tetrachloride. The resultant titanium-containing solid product was filtered at the same temperature and washed with toluene. The titanium content of the titanium-containing solid product was 5.1% by weight.

1.9 g of titanium-containing solid product were suspended in 50 ml of toluene, and 4 millimoles of ethyl benzoate were added to the suspension. The mixture was maintained at a temperature of 90° C. while being stirred for one hour. The treated solid product was filtered at the same temperature and washed with toluene.

The treated solid product was suspended in 50 ml of toluene, and 200 millimoles of titanium tetrachloride were added to the suspension. The mixture was stirred at a temperature of 110° C. for one hour so as to allow the treated solid product to come into contact with titanium tetrachloride. The resultant solid catalytic ingredient was filtered at the same temperature and washed with toluene and, then, with n-heptane.

The resultant solid catalytic ingredient in an amount of 2.0 g was suspended in 50 ml of n-heptane. The titanium content of the solid catalytic ingredient was 3.0% by weight.

(3) Polymerization

A sealed glass ampoule, in which the suspension of the solid catalytic ingredient (9.7 mg) had been placed, was fitted in a 1-liter autoclave with a stirrer, and, thereafter the air in the autoclave was replaced by nitrogen gas.

5.9 ml of a solution of 0.41 millimoles of p-methyl toluate in n-heptane and, then, 3.3 ml of 1.25 millimoles of triethyl aluminum in n-heptane were charged into the autoclave.

Subsequently, 600 ml liquid propylene were introduced into the autoclave.

When the content in the autoclave was heated up to a temperature of 65° C., a stirring operation was applied so as to break the glass ampoule. The polymerization of propylene was continued at a temperature of 65° C. for one hour.

After the polymerization was completed, non-reacted propylene was discharged and the broken glass pieces were removed. The resultant polypropylene was dried at a temperature of 50° C. under reduced pressure.

86.3 g of white polypropylene powder were obtained.
The polymerization activity was 8,900 and H.I. was 94.2%.

EXAMPLE 2

The same procedures as those in Example 1 were carried out to effect the polymerization of propylene, except that p-methyl toluate was used in an amount of 0.50 millimoles.

The polymerization activity was 5,700 and H.I. was 95.4%.

EXAMPLE 3

The same procedures as those in Example 1 were carried out to affect the polymerization of propylene, except that triethyl aluminum was used in an amount of 0.61 millimoles.

The polymerization activity was 8.750 and H.I. was 95.1%.

EXAMPLE 4 to 6

The same procedures as those in Example 1 were carried out to effect the polymerization of propylene, except that before the liquid propylene was introduced, hydrogen was introduced into the autoclave until the pressure indicated in Table 1 was obtained.

The results are summarized in Table 1.

TABLE 1

| Example | Pressure of hydrogen, kg/cm$^2$ | Polymerization activity | H.I., % |
|---|---|---|---|
| 4 | 0.2 | 8,500 | 92.0 |
| 5 | 0.5 | 7,430 | 91.5 |
| 6 | 0.9 | 6,390 | 90.2 |

EXAMPLE 7

Propylene was polymerized by repeating the procedures as described in Example 1, except that ethyl benzoate was used in an amount of 3.2 millimoles upon the preparation of the solid catalytic ingredient.

The polymerization activity was 11,400 and H.I. was 94.0%.

We claim:

1. A method for polymerizing an α-olefin which comprises bringing, in the presence of an organic acid ester, a feed containing at least one α-olefin, having 3 or more carbon atoms, into contact with a catalyst composed of:
a solid catalytic ingredient which has been prepared in such a manner that an aluminosiloxy compound of the formula,

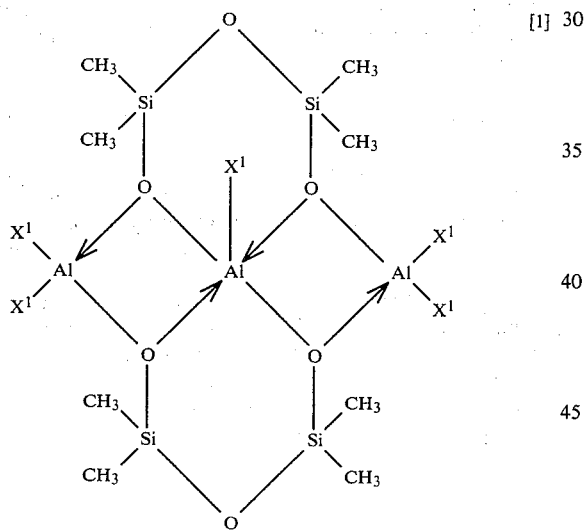

[I]

wherein $X^1$ represents a chlorine atom, a bromine atom or an iodine atom, is reacted with a Grignard compound of the formula $R^1MgX^2$[II] wherein $R^1$ represents an alkyl radical having 1 to 8 carbon atoms and $X^2$ represents a halogen atom, the resultant solid reaction product is brought into contact with a titanium tetrahalide, the resultant titanium-containing solid product is treated with an organic acid ester, and the treated solid product is brought into contact with a titanium tetrahalide; and
a trialkyl aluminum.

2. A method as claimed in claim 1, wherein said α-olefin is selected from the group consisting of propylene, 1-butene, 4-methyl-1-pentene and 1-hexene.

3. A method as claimed in claim 1, wherein the contact of said feed with said catalyst is carried out at a temperature of 30° to 100° C.

4. A method as claimed in claim 1, wherein the contact of said feed with said catalyst is effected under a pressure of 1 to 80 kg/cm$^2$.

5. A method as claimed in claim 1, wherein said Grignard compound is selected from those of the formula [II] in which $X^2$ is a chlorine atom.

6. A method as claimed in claim 5, wherein said Grignard compound is selected from the group consisting of butylmagnesium chloride, hexylmagnesium chloride and propylmagnesium chloride.

7. A method as claimed in claim 1, wherein said Grignard compound is used in an amount of 0.1 to 10 moles per mole of said aluminosiloxy compound.

8. A method as claimed in claim 1, wherein said reaction of said aluminosiloxy compound and said Grignard compound is carried out at a temperature of −50° to +50° C.

9. A method as claimed in claim 1, wherein said titanium tetrahalide is selected from the group consisting of titanium tetrachloride, titanium tetrabromide and titanium tetraiodide.

10. A method as claimed in claim 1, wherein said titanium tetrahalide is used in an amount of at least one mole per mole of said Grignard compound used.

11. A method as claimed in claim 1, wherein the contact of said solid reaction product or treated solid product with said titanium tetrahalide is carried out at a temperature of 20° to 200° C.

12. A method as claimed in claim 1, wherein said titanium-containing solid product contains 0.5 to 10% by weight of titanium.

13. A method as claimed in claim 1, wherein said solid catalytic ingredient contains 0.5 to 5% by weight of titanium.

14. A method as claimed in claim 1, wherein said organic acid ester to be used in the treatment of said titanium-containing solid product is an aromatic carboxylic acid ester of the formula,

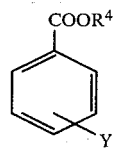

wherein $R^4$ represents an alkyl radical having 1 to 6 carbon atoms and Y represents a hydrogen atom, an alkyl radical having 1 to 4 carbon atoms or a radical of the formula —$OR^5$ in which $R^5$ represents an alkyl radical having 1 to 4 carbon atoms.

15. A method as claimed in claim 14, wherein said aromatic carboxylic acid ester is selected from the group consisting of methyl benzoate, ethyl benzoate, methyl toluate, ethyl toluate, methyl anisate and ethyl anisate.

16. A method as claimed in claim 1, wherein in the treatment of said titanium-containing solid product, said organic acid ester is used in an amount of 0.1 to 10 millimoles per gram of said titanium-containing solid product.

17. A method as claimed in claim 1, wherein the treatment of said titanium-containing solid product with said organic acid ester is carried out at a temperature of 0° to 200° C.

18. A method as claimed in claim 1, wherein said trialkyl aluminum is selected from those of the formula AlR$_3^6$ wherein R$^6$ represents an alkyl radical having 2 to 6 carbon atoms.

19. A method as claimed in claim 18, wherein said trialkyl aluminum is selected from the group consisting of triethylaluminum, tri-isobutylaluminum and tri-n-hexylaluminum.

20. A method as claimed in claim 1, wherein said trialkyl aluminum is used in an amount of 1 to 1000 moles per gram atom of titanium contained in said solid catalytic ingredient.

21. A method as claimed in claim 1, wherein the contact of said feed with said catalyst is effected in the presence of said organic acid ester in an amount of 0.05 to 0.6 moles per mole of said trialkyl aluminum contained in said catalyst.

22. A method as claimed in claim 1, wherein said catalyst is employed in an amount, in terms of elemental titanium, of 0.001 to 10 milligram atoms per liter of the polymerization mixture.

23. A method as claimed in claim 1, wherein said catalyst is employed in an amount, in terms of the trialkyl aluminum, of 0.01 to 1000 millimoles per liter of the polymerization mixture.

* * * * *

UNITED STATES PATENT AND TRADEMARK OFFICE
CERTIFICATE OF CORRECTION

PATENT NO. : 4,324,877
DATED : April 13, 1982
INVENTOR(S) : Haruo Ueno, et al

It is certified that error appears in the above—identified patent and that said Letters Patent is hereby corrected as shown below:

Column 5, line 48: "alumiosiloxy" should be --aluminosiloxy--.

Column 6, line 63: "8.750" should be --8,750--.

Signed and Sealed this

Twenty-second Day of February 1983

[SEAL]

Attest:

GERALD J. MOSSINGHOFF

Attesting Officer       Commissioner of Patents and Trademarks